United States Patent [19]

Fukushima et al.

[11] Patent Number: 4,542,061

[45] Date of Patent: Sep. 17, 1985

[54] PLASTIC FILM

[75] Inventors: Nobuo Fukushima, Honmachi; Shuji Kitamura, Ibaraki; Kiyohiko Nakae, Nishinomiya; Kozo Kotani, Toyonaka; Takayuki Terazawa, Shiga; Toyoaki Nakarai, Minoo, all of Japan

[73] Assignee: Sumitomo Chemical Company, Limited, Osaka, Japan

[21] Appl. No.: 457,153

[22] Filed: Jan. 11, 1983

[30] Foreign Application Priority Data

Jan. 27, 1982 [JP] Japan ................................... 57-12129

[51] Int. Cl.$^4$ ............................................. B32B 27/08
[52] U.S. Cl. .................................... 428/220; 428/516; 47/9; 47/29
[58] Field of Search ............... 428/522, 516, 340, 220; 47/9, 29

[56] References Cited

U.S. PATENT DOCUMENTS 4,075,784  2/1978  Pied et al. ................................. 47/9
4,329,388  5/1982  Vicik et al. ......................... 428/516

FOREIGN PATENT DOCUMENTS 1518016  7/1978  United Kingdom .

Primary Examiner—George F. Lesmes
Assistant Examiner—E. Rollins Buffalow
Attorney, Agent, or Firm—Armstrong, Nikaido, Marmelstein & Kubovcik

[57] ABSTRACT

An infrared radiation absorbing film suitable for agricultural purposes comprising a first layer of olefin resin containing an amorphous hydrated aluminosilicate gel and optionally, additional layers of an olefin resin encompassing said first layer.

8 Claims, No Drawings

PLASTIC FILM

The present invention relates to an infrared radiation absorbing film, especially a film for agricultural use, improved in heat retention, transparency, abrasion resistance and durability, which is composed mainly of an olefin resin.

Up to this time, as covering materials for agricultural houses or tunnels for greenhouse cultivation, there have been mainly used polyvinyl chloride films or polyolefine resin films, such as polyethylene films and ethylene/vinyl acetate copolymer films. Among these films, since polyvinyl chloride films are excellent in heat retention, transparency, toughness, durability, etc., they have been widely used up to recent years in this field. However, polyvinyl chloride films have a disadvantage in that the plasticizer contained in the film bleeds out to the surface during use, permitting adhesion of dust which seriously impairs the transmission of light and prevents temperature elevation in greenhouses. Said film has another problem in that when burned after use, it releases hydrogen chloride gas and therefore its disposal is difficult.

The film has a further problem in that it is not usable in cold districts because it looses flexibility and becomes poor in impact strength at low temperatures.

On the other hand, since olefin resin film, which contains no plasticizer and is stable in chemical structure, remains almost unchanged in its ability in light transmission during a long period of use and the film produces no harmful gas even when incinerated. Thus this film is superior to polyvinyl chloride film in these points but is inferior thereto in heat retention. For this reason, olefin resin film has not been widely used as a covering film for greenhouses in spite of the foregoing advantage in continuation of light transmission.

In recent years, ethylene/vinyl acetate copolymer film, one of the olefin resin films, attracts attention as a covering material for agricultural use because of its transparency, flexibility, and cold resistance. However, in addition to the abovementioned inferiority to polyvinyl chloride film in heat retention, the ethylene/vinyl acetate copolymer film is poor in abrasion resistance. Concretely speaking, it breaks down by rubbing at the piping portions and fixing bands of pipe-assembled greenhouses when closed and opened repeatedly for ventilation or flapped by wind.

In general, the heat retention of covering films for greenhouses is an ability of preventing the greenhouse temperature from lowering at night. The heat of the sunlight absorbed by the soil in the greenhouse in the day time radiates from the surface of the soil as radiation at night to keep the internal temperature higher than the open air temperature. When the covering film transmits the radiation from the soil surface greatly, the greenhouse releases the radiation to the outside, consequently failing in keeping the internal temperature higher than that of the open air. Accordingly, the heat retention of a covering film depends on the degree of its absorption and reflectance of the radiation. The higher the degree, the higher is the heat retention.

Among olefin resin films improved in heat retention for use as coverings, there are known those prepared from an olefin resin mixed with a specific inorganic filler such as a phosphate compound, silicon oxide, dehydrated kaolinite or zeolite, as seen in Japanese Patent Publication No. 9260/1972, and No. 13853/1972, and Japanese Laid-open Patent Application No. 105843/1974, No. 32938/1977, and No. 151044/1980. However, such films, although improved in heat retention, are still unsatisfactory in comparison with polyvinyl chloride films. Furthermore, these films obtained by adding inorganic fillers have defects in that they have a low total light transmittance, and especially a low parallel high transmittance, that is to say, only films like frosted glass can be obtained. To remedy such defects, we have provided in Japanese Laid-open Patent Application No. 151042/1980 a method of obtaining films of better parallel ligh transmittance by using an aluminium silicate $(SiO_2)_x \cdot (Al_2O_3)_p \cdot nH_2O$ or a titanium silicate $(SiO_2)_r \cdot (TiOhd2)_y \cdot nH_2O$ which has the same refractive index as that of the resin used. However, these films, similarly to those provided by the above-mentioned various techniques, when processed by an ordinary film processing method, such as T die cast method or inflation method, the molten resin is cooled and solidified while it is stretched, so that the surface of the film tends to become rough, thus lowering the parallel light transmittance. Therefore, to obtain a film of good parallel light transmittance, special consideration was necessary upon processing.

Besides the problem of light transmittance, the roughness of the film surface has proposed a problem of liableness in film breakage caused by friction at piping portions or fixing band portions of the greenhouse.

In Japanese Laid-open Patent Application No. 16343/1977 and No. 47449/1977, there have been proposed films for agricultural use composed of a plurality of films comprising a heat retaining film layer containing a silicate compound, phosphate compound, fine powder of glass, etc., a weather resisting film and a drop preventing film. However, by only adding the inorganic fillers mentioned, it is impossible to obtain films of good parallel light transmittance, because the refractive index of the resin and that of the fillers are different, even if the inorganic filler-containing layer is completely covered with another film layer.

It is generally said that covering films for agricultural use should have a total transmittance of more than 80 to 85%. However, even if the total transmittance meets the requirement, the effects on crops are largely different depending on which of parallel light transmittance or scattered light transmittance is more powerful. In recent years, it has become gradually clear that parallel light is generally favorable for the growth of vegetable fruits such as for example tomato, cucumber and watermelon, which are originally summer crops, while scattered light often causes problems in the coloring and growth of fruits but is rather favorable for the growth of seedlings of edible herbs such as lettuce and cabbage, and paddy rice plants, since it promotes the growth of the leaves. However, farmers still often use transparent polyvinyl chloride film which satisfactorily transmits parallel light for the cultivation of not only vegetable fruits but also edible herbs, except paddy rice plants. This is also due to the great advantage that the growth of crops in greenhouses can be seen through from outside.

As a means for improving the heat retention and and parallel light transmittance by using olefin resins as the basic component, we have provided a technique in Japanese Laid-open Patent Application No. 84955/1981 as an improvement of Japanese Laid-open Patent Application No. 151041/1980 and No. 151042/1980. However, it has been found that the film was not sufficient in durability, although it was good in heat retention and parallel light transmittance.

Although the foregoing technique has long been known for improving the low heat retention of polyolefin films by incorporating a specific inorganic filler in polyolefin, the technique has not been generally used for the reasons given above.

We have made an intensive study to provide agricultural films at a low cost which are free from the defects of the conventional agricultural olefin resin films and are excellent in the continuance of water drop prevention and durability, in addition to heat retention, transmittance of parallel light and abrasion resistance. As a result, we have found that such a film composed of a composition incorporated with a powder of an aluminosilicate having a refractive index almost equal to that of olefin resin, is excellent in total light transmittance, heat retention, continuance of water drop prevention and durability, and that by providing on the inner and outer surface thereof a layer of at least one resin selected from the group consisting of ionomer resins and olefin resins, it is possible to obtain a flilm combining parallel light transmittance, heat retention, abrasion resistance, continuance of water drop prevention and durability which are excellent over those of the prior techniques. The present invention has been accomplished on this discovery.

A first feature of the invention is that, although an inorganic filler is admixed with the olefine resin, the scattering of light at the resin/filler interface can be prevented to result in greatly reduced internal haze, by making the refractive index of the filler equal to that of the olefin resin, and that the resin layers free from any filler and formed on the inner and outer surfaces of the film component greatly remedy the surface irregularities formed during the production of the film, consequently greatly reducing the external haze also and affording a transparent film having excellent parallel light transmittance, and further that the heat retention, which is low with conventional olefin resin films, can be elevated greatly to a level almost comparable to that of polyvinyl chloride films.

A second feature of the invention is that the abrasion resistant resin layers free from any filler and formed on the inner and outer surfaces give the resulting film a greatly enhanced abrasion resistance almost comparable to the toughness of polyvinyl chloride films.

A third feature of the invention is that the film has excellent continuance in the prevention of water drops for a long period of time because a surface-active agent such as water drop preventing agent absorbed once upon processing is bled out gradually to the film surface by the absorbing ability peculiar to the aluminosilicate.

A fourth feature of the invention is that the method can provide a better weathering resistance in comparison with the technique previously proposed by us in which a filler having a refractive index almost equal to that of the resin is inorporated into the resin.

A fifth feature of the invention is that the compositions of the present invention composed mainly of an olefin resin can be easily subjected to incineration treatment after use, because the compositions do not generate any injurious gas like hydrogen chloride gas upon incineration.

The foregoing features are the advantages of the present invention over the conventional techniques.

In the following the invention will be described in further detail.

Among the olefin resins used in the present invention as a mono-layer or as a middle layer in the case of a multilayer film, there may be mentioned homopolymers of alfa-olefin, copolymers of alfa-olefin (main component) with other monomers, for example, polyethylene, polypropylene, ethylene/propylene copolymers, ethylene/butene copolymers, ethylene/4-methyl-1-pentene copolymers, ethylene/hexene copolymers, ethylene/octene copolymers, ethylene/vinyl acetate copolymers, ethylene/acrylic acid copolymers, ethylene/alkyl(meth)acrylate copolymers, etc. Among these polymers, low density polyethylene and ethylene/alfa-olefin copolymers having a density of from 0.910 to 0.935, ethylene/vinyl acetate copolymers containing less than 30 weight % vinyl acetate and ethylene/alkyl(meth)acrylate copolymers containing from 0.5 mol % to 15 mol % alkyl(meth)acrylate, among others ethylene/methacrylate copolymers and ethylene/ethylacryalte copolymers are favorable for agricultural films in respect of transparency, weathering resistance and cost. Among these, ethylene/vinyl acetate copolymers containing 5 to 25 weight % of vinyl acetate are especially desirable in transparency, flexibility, weathering resistance, etc.

Olefin resins useful in the present invention as inner and outer layers in the case of a multi-layer film are in the same category as those already mentioned for use as the middle layer. Preferable among them are those having good abrasion resistance. We have made an intensive study and found that covering materials for greenhouses become deteriorated and broken by the friction at the frame (e.g. iron pipes, bamboo) of greenhouses and bands for fixing the materials on the frame, when closed and opened repeatedly for ventilation or vibrated by wind, as well as by the heat generated by friction or given by the sunlight. Accordingly, olefin resins useful for the inner and outer layers are those having high resistance to heat and abrasion and less prone to frictional heat generation. For example, polyethylene or ethylene/alfa-olefine copolymers having a density of 0.910 to 0.935 g/cm$^3$ and a melt index of 0.1 g/10 min. to 4 g/10 min. are preferred. Resins having a density of less than 0.910 g/cm$^3$ are not desirable in respect of heat resistance. With a density higher than 0.935 g/cm$^3$, the film will not be fully transpatent. Resin with a melt index less than 0.1 g/10 min. are not satisfactorily processable, and those having a melt index more than 4 g/10 min. are undesirable in frictional resistance or strength. Although the process for producing such polyethylene or ethylene/alfa-olefin copolymers is not particularly limited, ethylene/alfa-olefin copolymers prepared by medium or low pressure process are more preferable than polyethylenes produced by the high pressure process in respect of heat resistance and durability.

Useful ethylene/vinyl acetate copolymers are those containing up to 20 weight %, preferably up to 10 weight %, of vinyl acetate and having a melt index of 0.1 g/10 min. to 3 g/10 min., preferably 0.1 g/10 min. to 1.5 g/10 min. With more than 20 weight % of vinyl acetate present, lower heat resistance will result. With a melt index less than 0.1 g/10 min., the copolymer is not satisfactorily processable, while with more than 3 g/10 min., the copolymer is low in abrasion resistance or strength.

In the case of ethylene/acrylic acid copolymers, those containing less than 30 weight %, among others 25 weight %, of acrylic acid are preferable.

In the case of ethylene/alkyl(meth)acrylate copolymers, those containing from 0.5 mol % to 10 mol %, especially from 0.7 ml % to 7 mol %, of alkyl(meth)acrylate are preferable in respect of abrasion resistance, strength and heat resistance. Especially preferable are ethylene/methyl(meth)acrylate copolymers and ethylene/ethylacrylate copolymers.

Ionomer resins useful in the present invention for the inner and outer layers are $\alpha$-olefin/$\alpha,\beta$-unsaturated carboxylic acid copolymers having a metallic ion-cross-linked structure. Usually the $\alpha$-olefin is ethylene, and $\alpha,\beta$-unsaturated carboxylic acid is methacrylic acid. The copolymer contains 1 to 5 mol % of methacrylic acid and $Na^+$ or $Zn^{++}$ as the metallic ions. Such a copolymer is commercially available under the trade name of Surlyn, a product of DuPont Co. Preferably usable in the present invention are those of the $Na^+$ or $Zn^{++}$ type having a density of 0.935 g/cm$^3$ to 0.975 g/cm$^3$ and a melt index of 0.5 g/10 min. to 7 g/10 min.

Among the resins mentioned above, ionomer resins and ethylene/acrylic acid copolymers are well-suited to the present invention because of especially high abrasion resistance.

Aluminosilicates useful in the present invention are represented by the formula:

$$(SiO_2)_x \cdot (Al_2O_3)_y \cdot (M_2O)_z \cdot n\ H_2O$$

wherein M represents a metal belonging to Group I-a of the periodic table, n is zero or a positive number, and x, y and z are positive numbers which are determined so that the refractive index of said aluminosilicate can be as close to that of the olefin resin as possible according to the gist of the present invention. Within the scope and spirit of the present invention, the aluminosilicate may contain a small amount of impurities such as other metallic oxides.

Examples of the foregoing metallic elements include for example Na, K, etc. Among these elements, Na is particularly preferable in respect of easy control of refractive index and the cost.

The refractive index ($n_A$) of the olefin resin used in the present invention is measured by using the D-line of Na at 25° C. under a relative humidity of 65%, and then the composition of the aluminosilicate is determined so that the ratio of the refractive index ($n_A$) of the olefin resin to the refractive index ($n_B$) of the aluminosilicate, ($n_A/n_B$), can fall within the range of $0.99 \leq n_A/n_B \leq 1.02$, preferably within the range of $0.995 \leq n_A/n_B \leq 1.01$. When the ratio $n_A/n_B$ is outside the above range, the parallel light transmittance of the film obtained lowers.

When the basic resin is an olefin resin, especially an ethylene resin, the molar ratio $SiO_2$: $Al_2O_3$: $Na_2O$ is important. Favorable ratios are $0.14 \leq y/x \leq 0.33$ and $0.2 \leq z/y \leq 1.6$, more preferable ratios are $0.15 \leq y/x \leq 0.3$ and $0.3 \leq z/y \leq 1.2$, and the most preferable ratios are $0.15 \leq y/x \leq 0.3$ and $0.3 \leq z/y \leq 0.8$.

Ratios outside these ranges will result in a low parallel light transmittance and a low weathering resistance of the film obtained, and when y/x or z/y exceeds the upper limit of said range, the heat retention will be lowered.

Preferred aluminosilicates of said composition are amorphous ones, and crystalline ones are unfavorable because of their low transparency. Among the amorphous aluminosilicates, anhydrides are inferior to hydrated gels in heat retention and continuance of water drop prevention, so that hydrated gels are most preferred.

The ignition loss (ignition loss in the present invention is an ignition loss when ignited at 800° C. for one hour after removal of adsorbed water by drying at 250° C. for 2 hours) of the aluminosilicates of the present invention should be from 4 weight % to 15 weight %.

Preferred aluminosilicate gels are those that have a large quantity of adsorbed water in view of the heat retention-improving effect which is an object of the present invention. For example, those preferred are ones having not less than 5 weight %, preferably not less than 10 weight % of adsorbed water at 25° C. under a relative humidity of 65%.

A possible supposition of the reason for this is that the heat retention-improving effect is elevated by a sinergetic effect of the impermeability of infrared ray of the aluminosilicate gel itself and that of water.

Furthermore, as for the aluminosilicate gel according to the present invention having the ability to adsorb such a large quantity of water, in addition to its exhibiting the water drop preventing effect when used in films, it has a further advantage of excellent continuance of that effect when a conventional water drop preventing agent or wetting agent for use in agricultural films is used together, since such an agent which has been adsorbed is gradually released. The aluminosilicate gel of the present invention has a better continuance effect in comparison with similar aluminum silicate gels or silica gels as described in Japanese Laid-open Patent Application No. 84955/1981, No. 151042/1980 and No. 18141/1981.

A possible supposition of the reason for this is that the aluminosilicate gel is composed of three components, that is, two components of compound oxides $Al_2O_3$ and $SiO_2$ as in the aluminum silicate gel and an alkali-metal oxide such as $Na_2O$ or $K_2O$ which is present as the third component.

Among the gels having a high adsorbing ability, zeolite is known. But, in spite of its high adsorbing effect, zeolite gives a film of poor transparency when incorporated therein. Thus, zeolite is not suitable for use in the present invention.

The term "adsorbed water" as used in the present invention is an amount of water adsorbed when the filler dried for two hours in a hot air drier maintained at 250° C. is allowed to stand in an atmosphere of a temperature of 25° C. under a relative humidity of 65%, and is calculated by the following formula:

$$\text{Amount of adsorbed water (\%)} = \frac{B - A}{A} \times 100$$

wherein A is the weight (grams) of the filler dried at 250° C. for 2 hours, and B is the weight (grams) of the filler when A is allowed to stand at 25° C. under a relative humidity of 65% so as to cause it to adsorb moisture until it reaches an equilibrium weight.

The term "ignition loss" as used in the calculation of filler composition is an amount of water lost when the filler dried in hot air at 250° C. for 2 hours is ignited at 800° C. for one hour, and it is calculated by the following formula:

$$\text{Ignition loss (\%)} = \frac{A - C}{C} \times 100$$

wherein A is the weight (grams) of the filler when died at 250° C. for two hours, and C is the weight (grams) of the filler when A is ignited at 800° C. for one hour.

Such aluminosilicate upon use must be finely pulverized to an average particle diameter of preferably less than 20 μ, and more preferably less than 10 μ, and the most preferably less than 5 μ.

When the average particle diameter exceeds that limit, the film obtained will have poor physical properties, so that such a particle diameter is not desirable.

The blending ratio of the aluminosilicate to the olefin resin is preferably 2 to 25 parts by weight, and more preferably 3 to 15 parts by weight, per 100 parts by weight of the olefin resin. With less than 2 parts by weight of the aluminosulicate, the film will not have appreciably improved heat retention, while when more than 25 parts by weight of the aluminosilicate is used, the film will have reduced strength, and therefore such an amount is not desirable.

In carrying out the process of the present invention, the olefin resin and the aluminosilicate in powder form are blended or kneaded by common methods using roll mixers, Bunbury mixers or extruders, followed by a film forming step, such as inflation processing, calendering, T-die processing or the like. The film is formed usually at a temperature between 130° and 250° C., when the aluminosilicate adsorbes water, the aluminosilicate should be dried prior to processing. (After film formation, the aluminosilicate will contain adsorbed water again.)

On the inner and outer surfaces of the film composed of the olefin resin containing such aluminosilicate, a layer of at least on resin selected from the group consisting of ionomer resins and olefin resins is formed by conventional techniques. For example the component films are separately formed and laminated by dry-laminating or heat-laminating process; layers of at least one resin selected from the group consisting of ionomer resins and olefin resins are laminated on an olefin resin film containing the aluminosilicate by extrusion; a laminated film is formed by the multi-layer extrusion process. Among these processes, the multi-layer extrusion process is preferable in respect of the ease of processing and good inter-laminar adhesive strength, high transparency and a low cost of the film. Furthermore, since films of large width are desired for agricultural uses, the multi-layer inflation process is desirable. The inner and outer layers, which may be formed of different resins, can be satisfactorily made from the same resin for usual applications in view of the cost of extruder, etc.

The thickness of the film (middle layer) composed of an olefin resin containing such aluminosilicate and that of the resin layers (outer and inner layers) formed on the outer and inner surfaces of the film are determined in accordance with the final use or purpose contemplated, so that they are not particularly limited. The middle layer usually has a thickness of about 30 microns to 200 microns depending on the heat retention desired and/or the proportion of the aluminosilicate relative to the resin. A sufficient thickness for the inner and outer layers is such that it can reduce the internal haze and display abrasion resistance. Thus, the thickness is about 10 microns to 20 microns for usual uses.

To obtain a better disperson of the aluminosilicate in the mono-layer or the middle layer in the case of a multi-layer film thus obtained, it is useful to admix with the composition of the invention 0.2 to 2 parts by weight of a dispersing agent, such as sorbitan monostearate or like sorbitan fatty acid ester, or glycerin monostearate or like glycerin fatty acid ester. It is also useful to incorporate into the mono-layer film or the middle layer and/or the inner and outer layers in the case of a multi-layer film, a suitable stabilizer, such as light stabilizer and heat stabilizer, etc., water drop preventing agent, and if required, other additives.

As for light stabilizers any one which is known per se as a light stabilizer for polyolefins may be used. For example, ultraviolet absorbers such as of benzophenone type, salicylate type, benzotriazole type, cyanoacrylate type, etc. and light stabilizers such as of hindered amine type and nickle complex type may be used. Among them, benzophenone type light stabilizers such as 2,4-dihydroxybenophenone, 2-hydroxy-4-alkoxybenzophenone, etc. and hindered amine type light stabilizers such as dimethyl succinate-1-(2-hydroxyethyl)-4-hydroxy-2,2,6,6-tetramethylpiperidine polycondensate, bis(2,2,6,6-tetramethyl-4-carbonyloxypiperidine)-p-dimethyl benzyl, bis(2,2,6,6-tetramethyl-4-piperidine)-sebacate, 4-benzoyloxy-2,2,6,6-tetramethyl piperidine, etc. are preferable. These hindered amine type light stabilizer are particularly suitable for the cultivation of agricultural products having an anthocyanin color such as egg-plant, beefsteak plant, etc. and of strawberry, etc. utilizing honey-bee. Preferably, these light stabilizers are added to the resin composition in an amount of about 500–20,000 ppm depending upon the particular purpose.

As for water drop preventing agents, there may be used surface active agents such as fatty acid esters of polyhydric alcohols, for example, fatty acid monoglycerides, fatty acid sorbitan esters, fatty acid polyglycerin esters, fatty acid trimethylolpropane esters, fatty acid pentaerythritol esters, etc. and alkylene oxide additives of said esters. In this case it is preferable to employ two or more by combining one or more having a relatively high rate of migration to the film surface and one or more having a relatively low rate of migration to the film surface in order to attain not only initial water drop prevention effect but also long-lasting water drop prevention effect. Thus, for example, a combined use of a fatty acid glycerin ester or sorbitan ester and a sorbitan-glycerin mixed polyol hydroxy fatty acid ester and a combined use of a fatty acid glycerin ester or sorbitan ester and an alkylene oxide additive of such ester are preferred. These water drop preventing agents may be added in an amount of 0.5–5% by weight based on the resin.

The olefin resin film obtained according to the present invention, when used as a covering film for greenhouses, exhibits a greater improving effect in heat retention in comparison with those of the prior techniques, that is to say, it has a high heat retentive performance comparable to that of polyvinyl chloride film. In addition, its parallel light transmittance is equal to that of polyvinyl chloride film, and besides its transmittance shows rather less change with the passage of time than that of polyvinyl chloride film. Also, the olefin resin film of the present invention has a remarkable excellence in parallel light transmittance over those of the conventional techniques which intend to improve the heat retention by incorporating an inorganic filler into the olefin resin.

Furthermore, the olefin resin film of the invention is excellent in abrasion resistance and toughness and is equal to polyvinyl chloride film in these properties.

Therefore the olefin resin film of the present invention is very useful as films for agricultural use.

In the following, the present invention will be explained with reference to examples which are only illustrative and not limitative.

The heat retention in the examples and comparative examples, was measured as follows: A test box (about 30 cm cube) was used of which one face was made of a test film and other faces a heat insulating material with aluminum plate on the inside surface; a heated block of 100° C. was inserted into the box, and temperature change in the box was measured by a thermistor. The same measurement was made using a test box having a glass plate 2 mm thick in place of the test film. The temperature difference ($\Delta T$°C.) obtained by subtracting the latter value from the former one was taken as the heat retention.

The transparency was expressed by a haze value and total transmittance which were measured by a haze meter according to JIS K-6714. The parallel light transmittance was given by the following equation:

Parallel light transmittance (%) = 100 − haze value (%)

The refractive index of the inorganic powder was measured by the dipping method, and that of the polymer film was measured by an Abbe's refractometer. The measurement was carried out using D-line of Na in a room maintained at 25° C. and at a RH of 65%.

The prevention of water drop deposit was tested as follows: Water (30° C.) was placed in a 100 cc beaker which was then covered with a test film, dipped in a constant temperature bath (30° C.), and placed in a sunny place. The state of the film after the passage of prescribed periods of time was observed.

The abrasion resistance was measured in the following manner. A test film of a known weight was fixed to the circular section of a cylinder, 200 mm in diameter, in a wrinkle-free state; an iron annular rotor, 100 mm in diameter, of which the surface to contact with the film had been polished well with #180 sand paper, was pressed against the fixed film to a depth 20 mm below the original film level; water (20 cc) was poured onto the surface of the film in order to avoid an extreme rise of temperature by friction; the rotor was rotated at 240 rpm until the film was broken; and the time required for film breakage and the loss in film weight per hour were measured.

EXAMPLE 1

One hundred parts by weight of an ethylene/vinyl acetate copolymer (melt index=2g/10 min; refractive index $n_A$=1.498) containing 15 weight % of vinyl acetate; 8 weight parts of an aluminosilicate gel (molar ratio $Al_2O_3/SiO_2$=y/x=0.22, molar ratio $Na_2O/Al_2O_3$=z/y=0.72; refractive index $n_B$=1.495; content of adsorbed water at 25° C. at a RH of 65%=13 weight %; radiographycally noncrystalline; average particle diameter=4 $\mu$) previously dried at 250° C. for 2 hours, consisting of 23 weight % $Al_2O_3$, 61 weight % $SiO_2$ and 10 weight % $Na_2O$, and having an ignition loss of 6 weight %; 0.3 weight part of glycerin monostearate as a dispersing agent and 0.3 weight parts of 2-hydroxy-4-n-octoxybenzophenone as a ultraviolet absorber, were kneaded at 150° C. for 8 minutes by means of a Brabender Plastograph and pressed at 170° C. to form a film having a thickness of 100 $\mu$. The thus-obtained film was transparent and had an excellent heat retention as shown in Table 1.

The film was also examined for resistance to weathering by means of a Sunshine Weather-O-Meter (black panel temperature 63° C.; water was sprayed for 18 minutes at intervals of 120 minutes). The retension of elongation was indicated by the formula:

$$(l_t/l_o) \times 100$$

wherein $l_o$ is the elongation of the sample before irradiation and $l_t$ is an elongation after irradiation for t hours. The results are shown in Table 2.

EXAMPLE 2

A film having a thickness of 100 $\mu$ was obtained in the same manner as in Example 1 except that, in place of the aluminosilicate gel used in Example 1, an aluminosilicate gel consisting of 22.8 weight % $Al_2O_3$, 60.4 weight % $SiO_2$ and 8.8 weight % $Na_2O$ and having an ignition loss of 8 weight % (molar ratio $Al_2O_3SiO_2$=(y/x)=0.22, molar ratio $Na_2O/Al_2O_3$=(z/y)=0.6; refractive index=1.495; content of adsorbed water at 25° C. at a RH of 65%=14 weight %; radiographically non-crystalline; average particle diameter=4 $\mu$) was used. The properties of the film obtained are shown in Table 1.

EXAMPLE 3

Example 1 was repeated except that, in place of the aluminosilicate gel used in Example 1, an aluminosilicate gel consisting of 22.8 weight % $Al_2O_3$, 68.1 weight % $SiO_2$ and 4.0 weight % $Na_2O$ and having an ignition loss of 4 weight % (molar ratio $Al_2O_3/SiO_2$=0.21, molar ratio $Na_2O/Al_2O_3$=0.3; refractive index=1.490; content of adsorbed water at 25° C. at a RH of 65%=14 weight %; radiographically non-crystalline; average particle diameter=4 $\mu$) was used. The results are shown in Table 1.

EXAMPLE 4

Example 1 was repeated except using an aluminosilicate having no ignition loss (refractive index $n_B$=1.496; content of adsorbed water at 25° C. at a RH of 65%=0.7; radiographically non-crystalline) obtained by igniting the aluminosilicate gel used in Example 1 at 800° C. for 2 hours to completely dehydrate it. The results are shown in Table 1.

COMPARATIVE EXAMPLE 1

Example 1 was repeated except that the aluminosilicate gel used in Example 1 was replaced with an aluminum silicate gel consisting of 26 weight % $Al_2O_3$ and 67 weight % $SiO_2$ and having an ignition loss of 7 weight % (refractive index $n_B$=1.493; content of adsorbed water at 25° C. at a RH of 65%=21 weight %; average particle diameter=4 $\mu$). The results are shown in Tables 1 and 2.

COMPARATIVE EXAMPLE 2

Example 1 was repeated except that the aluminosilicate gel used in Example 1 was replaced with zeolite Type 4 A (composition, etc. are shown in Table 1; radiographically crystalline). The results are shown in Table 1.

COMPARATIVE EXAMPLE 3

Example 1 was repeated except that the aluminosilicate gel used in Example 1 was replaced with zeolite (radiographically crystalline; composition, etc. are shown in Table 1). The results are shown in Table 1.

COMPARATIVE EXAMPLE 4

Example 1 was repeated except that the aluminosilicate gel used in Example 1 was replaced with kaolinite (radiographically crystalline; composition, etc. are shown in Table 1). The results are shown in Table 1.

COMPARATIVE EXAMPLE 5

Example 1 was repeated except that the aluminosilicate gel used in Example 1 was replaced with silica gel (radiographically non-crystalline; composition, etc. are shown in Table 1). The results are shown in Table 1.

EXAMPLE 5

One hundred weight parts of an ethylene/vinyl acetate copolymer (melt index=2 g/10 min.: refractive index $n_A=1.498$) containing 15 weight % vinyl acetate, 8 weight parts an aluminosilicate gel previously dried at 250° C. for 2 hours, consisting of 23 weight % $Al_2O_3$, 61 weight % $SiO_2$ and 10 weight % $Na_2O$ and having an ignition loss of 6 weight % (refractive index $n_B=1.495$, content of adsorbed water at 25° C., 65% RH=13 weight %; average particle diameter=4 μ), and 0.3 weight part of glycerin monostearate and 1.0 weight part of polyglycerin stearate as water drop preventing agents, were kneaded at a resin temperature of 130° to 150° C. for 10 minutes by a 5 liter Bunbury mixer, and formed into pellets by an extruder. The resulting mixture is referred to as filler-mixed resin hereinafter.

A three-layer transparent film of sandwich structure was prepared using a multi-layer inflation apparatus equipped with a three-slit inflation die (diameter 150 mm) for use of two kinds of resins. To the middle slit of the die was supplied the filler-mixed resin through a 40 mm diameter extruder under the condition of a fusion zone temperature of 180° C. and a die temperature of 190° C. at a rate of 9 kg/hr., and to the outer and inner slits of the die was supplied Hi-milan ® 1650 (Zn ion type ethylene/methacrylic acid copolymer produced by Mitsui Polychemical Co.; density=0.95; melt in-

TABLE 1

| | Filler | $Al_2O_3$ $SiO_2$ | $Na_2O$ $Al_2O_3$ | Ignition loss (%) | Content of adsorbed water at 25° C. 65% RH | Refractive index | $n_A/n_B$ | Total transmittance (%) | Parallel light transmittance (%) | Haze (%) | Heat retention Δ T (°C.) |
|---|---|---|---|---|---|---|---|---|---|---|---|
| Example 1 | non-crystalline aluminosilicate gel | 0.22 | 0.72 | 6 | 13 | 1.495 | 1.002 | 91.5 | 96.1 | 3.9 | −0.4 |
| Example 2 | non-crystalline aluminosilicate gel | 0.22 | 0.6 | 8 | 14 | 1.495 | 1.002 | 91.5 | 96.2 | 3.8 | −0.4 |
| Example 3 | non-crystalline aluminosilicate gel | 0.21 | 0.3 | 4 | 11 | 1.490 | 1.005 | 91.2 | 94.7 | 5.3 | −0.3 |
| Example 4 | anhydrous non-crystalline aluminosilicate | 0.22 | 0.72 | 0 | 0.7 | 1.496 | 1.001 | 91.5 | 96.2 | 3.8 | −0.7 |
| Comparative Example 1 | aluminum silicate gel | 0.23 | 0 | 7 | 21 | 1.493 | 1.003 | 91.2 | 96.2 | 3.8 | −0.4 |
| Comparative Example 2 | zeolite 4 A | 0.5 | 1.0 | 18 | 10.5 | 1.48 | 1.01 | 87.2 | 62.9 | 37.1 | −0.8 |
| Comparative Example 3 | zeolite | 0.10 | 0.87 | 11 | 5 | 1.48 | 1.01 | 88.7 | 69.7 | 30.3 | −0.9 |
| Comparative Example 4 | kaolinite | 0.50 | 0 | 13.5 | 3 | 1.56 | 0.96 | 90.6 | 61.0 | 39.0 | −1.2 |
| Comparative Example 5 | silica gel | — | — | 10 | 15 | 1.46 | 1.03 | 89.6 | 62.8 | 37.2 | −0.4 |

TABLE 2

Variation of the retention of elongation of the films with the passage of irradiation time

| Irradiation time (hrs) | 0 | 200 | 500 | 1000 |
|---|---|---|---|---|
| Example 1 | 100 | 105 | 110 | 60 |
| Comparative Example 1 | 100 | 105 | 100 | 10 | dex=1.5) through another extruder under the condition of a fusion zone temperature of 215° C. and a die temperature of 190° C. at a rate of 4.2 kg/hr. The resins supplied to the three slits were laminated together in said die to form a tubular film having a three-layer sandwich structure. The tubular film was taken up under the condition of a blow-up ratio of 2.4, a frost line distance of 200 mm and a take-up speed of 4.9 m/min. In this way, a three-layer transparent film of sandwich structure having a folded width of 365 mm, a thickness of the inner layer of 0.013 mm, a thickness of the middle layer of 0.05 mm and a thickness of the outer layer of 0.013 mm, was obtained.

The inner and outer layers were also subjected to water drop preventing treatment in the same way as the middle layer.

The thus-obtained film was measure for the heat retention, total transmittance, parallel light transmittance, haze, tear strength, punching impact strength and abrasion resistance. The results are shown in Table 3.

Further, the film was measured for the change of water drop preventing power with the passage of time. Even after 9 months, the film exhibited a good water drop preventing ability as shown in Table 4.

EXAMPLE 6

Example 5 was repeated except that Hi-milan ® 1650 used for the inner and outer layers in Example 5 was replaced with Hi-milan ® 1707 (density=0.95 g/cm³; melt index=0.9 g/10 min; Na ion type ethylene/methacrylic acid copolymer) and the extrusion temperature condition was changed to a fusion zone temperature of 220° C. and a die temperature of 195° C. In this way, a transparent film was obtained. The physical properties of the film thus obtained are shown in Table 3.

EXAMPLE 7

Example 5 was repeated except that Hi-milan ® 1650 used for the inner and outer layers in Example 5 was replaced with a high-pressure process low density polyethylene (Sumikathene ® F 208-1) having a density of 0.925 g/cm³ and a melt index of 1.7 g/10 min, and the extrusion temperature condition was changed to a fusion zone temperature of 173° C. and a die temperature of 168° C. In this manner, a transparent film was obtained. The physical properties of the film are shown in Table 3.

EXAMPLE 8

Example 5 was repeated except that in place of Hi-milan ® 1650 used for the inner and outer layers in Example 5, an ethylene/4-methyl-1-pentene copolymer (4-methyl-1-pentene content 9 weight %) obtained with a Ziegler catalyst system and having a density of 0.920 g/cm³, and a melt index of 2 g/10 min, was used, and the extrusion temperature condition was changed to a fusion zone temperature of 175° C. and a die temperature of 168° C. In this way, a transparent film was obtained. The physical properties of the film are shown in Table 3.

EXAMPLE 9

Example 9 was repeated except that in place of Hi-milan ® 1650 used for the inner and outer layers in Example 5, an ethylene/butene copolymer (content of butene-1=10 weight %) polymerized with a Ziegler catalyst and having a density of 0.920 g/cm³ and a melt index of 1.5 g/10 min, was used and the extrusion temperature condition was changed to a fusion zone temperature of 175° C. and a die temperature of 168° C. In this manner, a transparent film was obtained. The physical properties of the film are shown in Table 3.

EXAMPLE 10

Example 5 was repeated except that, in place of Hi-milan ® 1650 used for the inner and outer layers in Example 5, an ethylene/vinyl acetate copolymer (content of vinyl acetate=15 weight %) having a density of 0.94 g/cm³ and a melt index of 0.6 g/10 min was used, and the extrusion temperature condition was changed to a fusion zone temperature of 175° C. and a die temperature of 168° C. In this manner, a transparent film was was obtained. The physical properties of the film are shown in Tables 3 and 4.

The water drop preventing ability was good after 9 months, as in Example 5.

EXAMPLE 11

Example 5 was repeated except that, in place of Hi-milan ® 1650 used for the inner and outer layers in Example 5, an ethylene/acrylic acid copolymer (content of acrylic acid=20 weight %) having a melt index of 10 g/10 min was used and the extrusion temperature condition was changed to a fusion zone temperature of 170° C. and a die temperature of 168° C. In this manner, a transparent film was obtained. The physical properties of the film are shown in Table 3.

EXAMPLE 12

Example 5 was repeated except that, in place of the aluminosilicate gel in the filler-mixed resin used for the middle layer in Example 5, the same amount of an aluminosilicate gel (consisting of 23 weight % $Al_2O_3$, 62.5 weight % $SiO_2$ and 9.0 weight % $Na_2O$; ignition loss 5 weight %; refractive index $n_B$=1.49; content of adsorbed water at 25° C. at a RH of 65%=7 weight %; average particle diameter=4 $\mu$) was used. The film thus obtained was measured for the physical properties. The results are shown in Table 3.

The water drop preventing ability of this film was a little inferior to the film of Example 5 in long period continuance, but it still remained good after 9 months.

EXAMPLE 13

Example 5 was repeated except that, in place of the ethyelen/vinyl acetate copolymer, the base of the filler-mixed resin, used for the middle layer in Example 5, a high-pressure process polyethylene (Sumikathene ® F 208-1) (density=0.925 g/cm³; melt index=1.7 g/10 min; refractive index $n_A$=1.501) was used, and in place of Hi-milan ® 1650 used for the inner and outer layers, Sumikathene ® F 208-1 was used, and that the extrusion temperature condition was changed to a fusion zone temperature of 173° C. and a die temperature of 168° C. for both the middle layer and the outer and inner layers. In this manner, a transparent film was obtained. The physical properties of the film are shown in Table 3.

COMPARATIVE EXAMPLE 6

A mono-layer tubular film, 0.075 mm thick, was obtained from the single composition of the ethylene/vinyl acetate copolymer, the base of the filler-mixed resin used for the middle layer in Example 5, by means of an extruder, 50 mm in caliber, equipped with a spiral die, 100 mm in caliber, under the condition of a fushion zone temperature of 180° C. and a die temperature of 177° C., at a blow-up ratio of 2.4, a frost line distance of 200 mm and a take-up speed of 5 m/min. The physical properties of the film are shown in Tables 3 and 4.

COMPARATIVE EXAMPLE 7

A film was obtained by repeating Example 5 except that, in place of the aluminosilicate gel in the filler-mixed resin used for the middle layer in Example 5, the same amount of a silica gel (ignition loss=10 weight %; refractive index 32 1.460; content of adsorbed water at 25° C. at a RH of 65%=15 weight %; average particle diameter=4 μ) was used. The film obtained was opaque, and the water drop preventing ability in continuance for a long period was considerably poor in comparison with that of the films of the present invention. The physical properties of the film are shown in Tables 3 and 4.

COMPARATIVE EXAMPLE 8

Example 7 was repeated except that, in place of the polyethylene used for the inner and outer layers in Example 7, a high-pressure process polythylene (density=0.922 g/cm$^3$; melt index=7 g/10 min) was used. A transparent film was obtained. The physical properties of the film are shown in Table 3.

COMPARATIVE EXAMPLE 9

A transparent film was obtained by repeating Example 10 except that, in place of the ethylene/vinyl acetate copolymer used for the inner and outer layers in Example 10, an ethylene/vinyl acetate copolymer (vinyl acetate content=17 weight %; density=0.94 g/cm$^3$; melt index=3 g/10 min) was used. The physical properties of the film are shown in Tables 3 and 4.

COMPARATIVE EXAMPLE 10

A transparent film was obtained by repeating Example 5 except that, in place of the aluminosilicate gel used in Example 5, an aluminum silicate gel (composition: 26 weight % Al$_2$O$_3$, and 67 weight % SiO$_2$; refractive index $n_B$=1.493; content of adsorbed water at 25° C. at a RH of 65%=21 weight %; average particle diameter=4 μ) was used. The water drop preventing ability in continuance for a long period of the film was considerably poor as in Comparative Example 8.

COMPARATIVE EXAMPLE 11

A commercial polyvinyl chloride film for agricultural use, 0.075 mm thick (containing about 40% of a plasticizer composed mainly of di-2-ethylhexyl phthalate) was measured for the physical properties. The results are shown in Tables 3 and 4.

TABLE 3

| | Film structure | | | | Physical properties of film | | | | | |
|---|---|---|---|---|---|---|---|---|---|---|
| | Middle layer (0.05 mm) | | | Inner and outer layers (0.013 mm) Resin | Optical properties | | | | Abrasion resistance | |
| | Base resin | Filler | Amount added PHR | | Total light transmittance (%) | Parallel light transmittance (%) | Haze (%) | Heat retention ΔT (°C.) | Abrasion loss (mg/h) | Time until breakage (min) |
| Example 5 | EVA | Alumino silicate gel | 8 wt % | Hi-milan 1650 | 91.0 | 93.0 | 7.0 | −0.4 | 0.5 | 220 |
| Example 6 | EVA | " | " | Hi-milan 1707 | 91.1 | 95.2 | 4.8 | −0.4 | 0.4 | 240 |
| Example 7 | EVA | " | " | LDPE | 90.5 | 95.5 | 4.5 | −0.5 | 0.6 | 180 |
| Example 8 | EVA | " | " | EMP | 91.0 | 93.1 | 6.9 | −0.5 | 0.7 | 170 |
| Example 9 | EVA | " | " | EB | 91.0 | 92.8 | 7.2 | −0.5 | 0.6 | 190 |
| Example 10 | EVA | " | " | EVA | 91.3 | 95.7 | 4.3 | −0.4 | 2.3 | 120 |
| Example 11 | EVA | " | " | EAA | 90.8 | 95.2 | 4.8 | −0.3 | 0.7 | 180 |
| Example 12 | EVA | " | " | Hi-milan 1650 | 90.8 | 92.6 | 7.4 | −0.5 | 0.5 | 220 |
| Example 13 | LDPE | " | | LDPE | 91.1 | 94.8 | 5.2 | −0.9 | 0.6 | 180 |
| Comparative Example 6 | | Film of sigle use of EVA | | | 91.7 | 97.5 | 2.5 | −1.6 | * | 40 |
| Comparative Example 7 | EVA | Silica gel | 8 wt % | Hi-milan 1650 | 89.9 | 60.0 | 40.0 | −0.4 | 0.5 | 220 |
| Comparative Example 8 | EVA | Alumino silicate gel | 8 wt % | LDPE | 90.5 | 94.9 | 5.1 | −0.4 | 8.5 | 90 |
| Comparative Example 9 | EVA | " | 8 wt % | EVA | 91.3 | 95.3 | 4.7 | −0.4 | ** | 25 |
| Comparative Example 10 | EVA | Aluminum silicate gel | 8 wt % | Hi-milan 1650 | 91.0 | 92.5 | 7.5 | −0.4 | 0.5 | 220 |
| Comparative Example 11 | | Polyvinyl chloride film for agricultural use | | | 91.8 | 93.9 | 6.1 | −0.4 | 1.8 | 220 |

(Note):
EVA = ethylene/vinyl acetate copolymer;
LDPE = high-pressure process low density polyethylene;
EMP = ethylene/4-methyl-1-pentene copolymer;
EB = ethylene/butene-1 copolymer;
EAA = ethylene/acrylic acid copolymer.
*measurement impossible because of breakage after 40 minutes;
**measurement impossible because of breakage after 25 minutes.

TABLE 4

| | Change of the water drop preventing ability with the passage of time | | | | | |
|---|---|---|---|---|---|---|
| | Number of months passed | | | | | |
| | 1 | 2 | 3 | 6 | 9 | 12 |
| Example 5 | ◎ | ◎ | ◎ | ◎ | ○ | Δ |
| Example 10 | ◎ | ◎ | ◎ | ◎ | ○ | Δ |
| Example 12 | ◎ | ◎ | ◎ | ◎ | ○ | Δ |

TABLE 4-continued

| Change of the water drop preventing ability with the passage of time | | | | | | |
|---|---|---|---|---|---|---|
| | Number of months passed | | | | | |
| | 1 | 2 | 3 | 6 | 9 | 12 |
| Comparative Example 6 | ⊚ | O | O | Δ | X | X |
| Comparative Example 7 | ⊚ | ⊚ | ⊚ | O | Δ | X |
| Comparative Example 10 | ⊚ | ⊚ | ⊚ | O | Δ | Δ |
| Comparative Example 11 | ⊚ | ⊚ | ⊚ | O | Δ | X |

(Evaluation of the water drop preventing ability)
⊚ Nearly no adhesion of water drops; the film surface is wetted well.
O Adhesion of large water drops is observed at extremely limited portions; wetting is rather poor.
Δ Adhesion of large water drops extends over nearly the whole surface.
X The whole surface if covered with small water droplets, and the interior is not seen through the film.

What we claim is:

1. An infrared radiation absorbing film comprising a layer of 100 weight parts of an olefin resin (A) and 2 to 25 weight parts of an amorphous hydrated aluminosilicate gel (B) and at least one other layer of at least one resin selected from the group consisting of ionomer resins (C) and olefin resins (D) being on the inner and outer surfaces of the layer,
   wherein the amorphous hydrated aluminosilicate gel and olefin resin (A) in the layer have a ratio of refractive index $n_A$ of the olefin resin (A) to refractive index $n_B$ of the amorphous hydrated aluminosilicate gel, ($n_A/n_B$), within the range of from 0.99 to 1.02, and the amorphous hydrated aluminosilicate gel has the following composition:

$$(SiO_2)_x \cdot (Al_2O_3)_y \cdot (M_2O)_x \cdot n\ H_2O$$

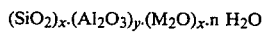

wherein M represents an alkali metal, $0.14 \leq y/x \leq 0.33$, $0.2 \leq z/y \leq 1.6$, and n is zero or a positive number.

2. The infrared radiation absorbing film as claimed in claim 1, wherein the amorphous hydrated aluminosilicate gel has a molar ratio $Al_2O_3/SiO_2$ of from 0.15 to 0.3, a molar ratio $Na_2O/Al_2O_3$ of from 0.3 to 0.8 and an ignition loss of from 4 weight % to 15 weight %.

3. The infrared radiation absorbing film as claimed in claim 1, wherein the amorphous hydrated aluminosilicate gel has a molar ratio $Al_2O_3/SiO_2$ of from 0.15 to 0.3, a molar ratio $Na_2O/Al_2O_3$ of from 0.3 to 0.8 and an ignition loss of from 4 weight % to 15 weight %, and of which the equilibrium adsorbed water content measured at a temperature of 25° C. under a relative humidity of 65% is more than 5 weight %.

4. The infrared radiation absorbing film as claimed in claim 1, wherein the olefin resin (A) of the layer is a low density polyethylene having a density of from 0.915 g/cm$^3$ to 0.935 g/cm$^3$, or an ethylene/α-olefin copolymer.

5. The infrared radiation absorbing film as claimed in claim 1, wherein the olefin resin (A) of the layer is an ethylene/vinyl acetate copolymer.

6. The infrared radiation absorbing film as claimed in claim 1, wherein the olefin resin used for the at least one other layer is a polyethylene or an ethylene/α-olefin copolymer having a density of from 0.915 g/cm$^3$ to 0.935 g/cm$^3$, and a melt index of from 0.1 g/10 min. to 4 g/10 min.

7. The infrared radiation absorbing film as claimed in claim 1, wherein the olefin resin used for the at least one other layer is an ethylene/vinyl acetate copolymer containing up to 20 weight % of vinyl acetate and having a melt index of from 0.1 g/10 min. to 3 g/10 min.

8. The infrared radiation absorbing film as claimed in claim 1, wherein the ionomer resin used for the at least one other layer is an ethylene/methacrylic acid copolymer having a zinc or sodium ion crosslinked structure and of which the density is from 0.935 g/cm$^3$ to 0.975 g/cm$^3$ and the melt index is from 0.5 g/10 min. to 7 g/10 min.

* * * * *